United States Patent [19]
Wu et al.

[11] Patent Number: 5,411,714
[45] Date of Patent: May 2, 1995

[54] THERMAL CONVERSION PYROLYSIS REACTOR SYSTEM

[76] Inventors: Arthur C. Wu; Sabrina C. Chen, both of 9 Binnacle La., Foster City, Calif. 94404

[21] Appl. No.: 12,911

[22] Filed: Feb. 3, 1993

Related U.S. Application Data

[63] Continuation-in-part of Ser. No. 863,747, Apr. 6, 1992, abandoned.

[51] Int. Cl.$^6$ .......................... B01J 8/08; F23K 3/10; C10B 1/60
[52] U.S. Cl. .................... 422/232; 422/233; 110/108; 110/110; 110/204; 110/229; 110/255; 201/2.5; 202/113; 202/117; 202/118; 202/226
[58] Field of Search ............. 422/132, 135, 137, 150, 422/232, 233; 585/241, 634, 801; 202/113, 117, 118, 226; 201/2.5; 110/108, 110, 204, 206, 229, 255; 48/209

[56] References Cited

U.S. PATENT DOCUMENTS

| | | | |
|---|---|---|---|
| 3,105,744 | 10/1963 | Luethge | 422/150 |
| 4,122,036 | 10/1978 | Lewis | 252/421 |
| 4,210,491 | 7/1980 | Schulman | 201/2.5 |
| 4,235,676 | 11/1980 | Chambers | 202/118 |
| 4,268,275 | 5/1981 | Chittick | 48/111 |
| 4,412,889 | 1/1983 | Deck | 202/117 |
| 4,590,039 | 5/1986 | Cheng | 422/150 |
| 4,686,008 | 8/1987 | Gibson | 202/118 |
| 5,085,738 | 2/1992 | Harris et al. | 201/11 |

Primary Examiner—Robert J. Warden
Assistant Examiner—Christopher Y. Kim
Attorney, Agent, or Firm—Michael J. Hughes

[57] ABSTRACT

A thermal conversion pyrolysis reactor system (10) is provided for use in providing a continuous flow type pyrolysis reaction for conversion of carbonizable input materials ("MW") (12). The reactor system (10) utilizes a diffusion material ("MD") (14) which is preheated and admixed with the MD (12) in order to facilitate pyrolysis and to partially catalyze reactions. Subsystems are provided to receive gaseous (30), liquid (32) and solid (32) phase outputs. The reactor system (10) includes further component subsystems for waste material MW input (22), MD input (26), reactor chamber (24), and heating (28). The MD (14) is preheated by being carried through the reactor chamber (64) prior to admixing with the MW (12) and further by exhaust gases (94) from the furnace space (88) being directed through a heat exchanger (126). The system (10) provides for recycling of MD (14) and is substantially self powered as a result of using combustible hydrocarbon gases produced by the pyrolysis reaction as fuel for turbulent burners (72). Input materials are evacuated of oxygen and a positive internal pressure is maintained in the reactor chamber (66) in order to maximally facilitate oxygen free pyrolysis. The system (10) is particularly adapted for use with tire chips, medical waste and industrial plastic waste input materials. Carbon black and pelletized metallic and alloy materials are preferred MD (14).

20 Claims, 4 Drawing Sheets

THERMAL CONVERSION PYROLYSIS REACTOR SYSTEM

This is a continuation-in-part of application, Ser. No. 07/863,747, filed by the inventors on 6 Apr. 1992, now abandoned.

TECHNICAL FIELD

The present invention relates generally to material reaction systems, and more particularly to thermal conversion pyrolysis reactors adapted to convert carbonizable materials into gas, liquid and solid residue. The preferred embodiment of the present invention is a thermal conversion pyrolysis reactor system especially adapted for decomposing carbon based materials in an oxygen free reactor environment. The invention is intended for use particularly with respect to pyrolysis of vehicle tires, industrial plastic waste and residential and hospital trash.

DESCRIPTION OF THE PRIOR ART

Pyrolysis is the term utilized to described the process by which carbonizable materials are converted to solid, gas and liquid residues, without combustion or oxidization. Pyrolysis processes are utilized in order to obtain usable component materials from waste products while avoiding production of unnecessary oxygen compounds and polluting materials.

Pyrolysis processes generally involve the pyrolytic conversion of carbon containing materials to hydrocarbon products. In order to avoid the introduction of unnecessary oxygen into their reaction process, leading to undesirable by products and side effects, it is important that the input feed system for the waste materials be structured so as to minimize the access of oxygen or ambient air. Several prior art patents have indicated mechanisms of preventing excess oxygen input. These have included such devices as air locks or other systems. One of these, Chambers U.S. Pat. No. 4,235,676, shows an inert gases purge operation which is utilized to continually remove the oxygen from the input to the pyrolysis chamber. However, the use of an input gas purge operation, even utilizing inert gases, decreases the heating value of the hydrocarbon gases from the pyrolysis process and can also lead to difficulties in the handling of fugitive vapors from the reaction region. In order to provide a pleasant working environment for the personnel in the vicinity of the reactor, it is important to pay attention to restraining the fugitive vapors which may escape from the input portion of the system.

Another area of technology in which attempts have been made to increase the efficiency of pyrolysis processes is in the area of development of high efficiency heat transfer processes to decompose the carbonizable materials. Some of these attempts have been indirect heat transfer processes such as the fluid bed apparatus described in Shatmen U.S. Pat. No. 4,210,491; the rotary drum mechanism of Jelinek, U.S. Pat. No. 4,840,129 and the Chambers structure described above, which includes a furnace bed having a hollow shaft containing exhaust circulation to improve heat transfer processes. The same principle, in an inverse application, is illustrated in Gibson U.S. Pat. No. 4,686,008. In this application the inner cylinder contains the heated exhaust gases and the outer chamber has the carbonizable materials, typically tire chips. It is a principle of thermodynamics that the heat transfer characteristics will decrease as the ratio of volume to surface area being heated is increased. Therefore, larger scale reactors according to the prior art structures are less efficient since a smaller component of the reaction material is receiving the heat transfer through the surface. Especially when the reaction material is a poor conductor of heat such as vehicle tire chips, heat transferred to the interior of the reaction shaft is unacceptably inefficient.

Since indirect heat transfer processes have been found to provide only limited heat contact surfaces and not entirely successful results, attempts have also been focused on direct heat transfer processes. Some of these are shown in Apffel U.S. Pat. No. 4,839,151, Harris et al. U.S. Pat. No. 5,085,738, and Haberman U.S. Pat. No. 4,038,100. These prior art processes have utilized teachings such as the use of superheated steam, thermal radiation and direct microwave heating to transfer heat to the tire materials in order to improve the pyrolysis yield. Other techniques, such as immersion in a liquid metal bath, have also been utilized but have been found to be unacceptable due to undesirable byproducts. Direct circulation of ceramic materials has also been utilized. Even in these sorts of processes, however, possible reaction between the waste material (which may include a very wide variety of components) and the ceramic can be a problem.

The prior art has also addressed problems such as clogging of the mechanisms and passages by carbonizable waste materials during the pyrolysis process. Oeck U.S. Pat. No. 4,412,889, shows applying a fluid cooling jacket surrounding the inlet conduit in order to maintain the input material at a temperature which allows it to be carried through the conduit without clogging. This requires additional heat input later in order to achieve pyrolysis. Special conduit cleaning structures are also disclosed. The structures, while desirable in certain circumstances, can increase the complexity of the system and have a corresponding decrease in reliability.

Various prior art patents have also addressed the nature and quality of the hydrocarbon products which are generated as a result of the pyrolysis process. To the extent that the liquid phase output includes viscous oils and tars and also to the extent that such may be part of the solid phase output of the pyrolysis process, extra steps are required in processing in order to produce more usable materials. Prior art methods such as those disclosed in Mudge et al. U.S. Pat. No. 4,865,625, wherein a gasification process is utilized to catalytically destruct the viscous tars and oils into gases, and Morita et al. U.S. Pat. No. 4,251,500, with a hydrocracking process for waste rubber with specific catalyst powders, have been shown. These processes introduce a level of complexity which would be desirably avoided by minimizing the generation of the undesirable viscous oils and tars in the original process.

Some types of waste input materials, such as hospital waste, may contain certain drug residues or other unstable hazardous chemical compound. In many instances, these undesirable chemical compounds need to be incinerated in a controlled hazardous waste incineration process, since conventional pyrolysis tends to vaporize the compounds with potentially undesirable releases to the atmosphere. In order to deal effectively with this sort of waste product, the pyrolysis process must be modified in order to stabilize or detoxify the undesirable compounds.

It has been shown in the prior art, such as Lewis U.S. Pat. No. 4,122,036, that a pyrolysis process for transforming sewage sludge into activated carbon, with the activated carbon mixed with the sludge to continue the pyrolysis process, can be effective. Further, Chittick U.S. Pat. No. 4,268,275, further shows pyrolysis reactions for converting organic material into carbon monoxide, hydrogen, water vapor and other oils and tars. When extra water is supplied into the pyrolysis process, the water vapor is further reacted with charcoal to produced carbon and hydrogen at substantially high temperatures. However, none of the art shown discusses thermal conversion to stabilize or detoxify the heated materials.

None of the prior art processes and apparatus have successfully optimized the treatment of carbonizable waste input materials. Special structures have been proposed and constructed to deal with specific problems associated with input materials such as tire chips and hospital waste, but no single overall process has been successful in dealing with a very wide variety of waste input materials in an efficient manner. For this reason, there remains substantial room for improvement in the field.

BRIEF DESCRIPTION OF THE INVENTION

Accordingly, it is an object of the present invention to provide an improved thermal conversion pyrolysis reactor system which may be efficiently utilized with a wide variety of carbonizable waste input materials.

It is another object of the preferred embodiment to provide a pyrolysis reactor system in which the input feeding operation is efficient, reliable and trouble free, while also providing for removal of oxygen containing gases and fugitive vapors.

It is a further object of the present invention to provide a pyrolysis reaction system utilizing an efficient diffusion material to provide maximum direct heat transfer to the waste input material.

It is another object of the invention to provide a pyrolysis reactor system in which the diffusion material is efficiently preheated in order to avoid undue energy loss from the system.

It is still another object of the present invention to provide a material flowpath through a pyrolysis reactor system which is resistant to clogging and is, to a degree, self-cleaning.

It is yet another object of the present invention to provide a pyrolysis system in which input waste material in the form of shredded tire materials may be converted into usable components, primarily hydrocarbon gases and low viscosity oils.

It is an additional object of the present invention to provide chemical stabilization and detoxification of hazardous chemical and drug waste materials during pyrolysis.

Still another object of the present invention is to provide a process in which diffusion material may be recovered and re-used, and additional diffusion material may be produced as a result of the process.

Briefly, a preferred embodiment of the present invention is a thermal conversion pyrolysis reactor system which is adapted for the treatment of input carbonizable waste materials ("Mass, Waste", or "MW"). The pyrolysis reactor system utilizes a substantially oxygen-free reaction environment to produce gaseous phase, liquid phase and solid phase output products from the waste input materials. A preheated diffusion material ("Mass, Diffusion" or "MD"), preferably in the form of carbon black, is introduced into the waste input stream in order to provide direct heat diffusion and, to a degree, catalytic conversion of the waste input materials into the desirable output materials. The preferred embodiment utilizes a waste input subsystem, a pyrolysis chamber subsystem, a diffusing material input subsystem, a heating subsystem and various output subsystems associated with gaseous, liquid and solid output materials. Each of the component subsystems of the pyrolysis reactor system is constructed in accordance with specific principles in order to achieve maximum efficiency and minimum complexity.

An advantage of the present invention is that the waste input subsystem and diffusion material input subsystem each utilize a three gate arrangement with vacuum operation in order to remove oxygen and fugitive vapors efficiently, avoiding contamination of the pyrolysis reactor chamber.

Another advantage of the present invention is that it utilizes a diffusion material to provide direct heat transfer to the waste materials, with the diffusion material selected to be corrosion resistant and to have good heat transfer properties.

A further advantage of the present invention is that the diffusion materials are preheated utilizing exhaust heat from the reaction chambers so as to minimize energy loss and maximize recycling efficiency.

Another advantage of the present invention is that the direct mixing of the diffusing material with the waste input material allows maximum direct heat transfer by conduction and increases overall heat transfer efficiency.

Still another advantage of the present invention is that the material transport mechanisms prevent clogging and introduces a degree of self-cleaning into the system without introducing cooling fluid or other structures which decrease overall heat transfer efficiency.

A further advantage of the present invention is that the use of thermally conducting diffusing materials results in an improved quality of oils generated from hydrocarbon based materials such as vehicle tire chips.

A still further advantage of the present invention is that the use of carbon black as a diffusing material can result in undesirable chemical compounds in the waste input material reacting with the carbon black, or being catalyzed thereby to react to form chemical compounds which do not share the undesirable characteristics of the original materials.

Yet another advantage of the present invention is that the diffusion material is non-corrosive and corrosion resistant and may be recovered, at least in part, from the solid phase output of the reactor system in order to be recycled for reuse.

Still another advantage of the present invention is that it may be operated continuously with minimal necessity for cleaning of the chamber or the transport path, and may thus be operated with a minimal amount of down time.

A further advantage of the inventive system is that a portion of the reaction products may be in the form of combustible materials which may be recycled as burner fuel, making the system substantially self-powered.

These and other objects and advantages of the present invention will become clear to those skilled in the art upon review of the following specification, the accompanying drawings and the appended claims.

BEST MODE FOR CARRYING OUT THE INVENTION

The best presently known mode for carrying out the invention is a thermal conversion pyrolysis reactor system which is adapted for use in pyrolyzing carbonizable waste materials into usable components. The reactor system is a flow process reactor which is adapted to be used in a commercial or municipal operation and with a wide variety of potential waste inputs.

Figure 1:
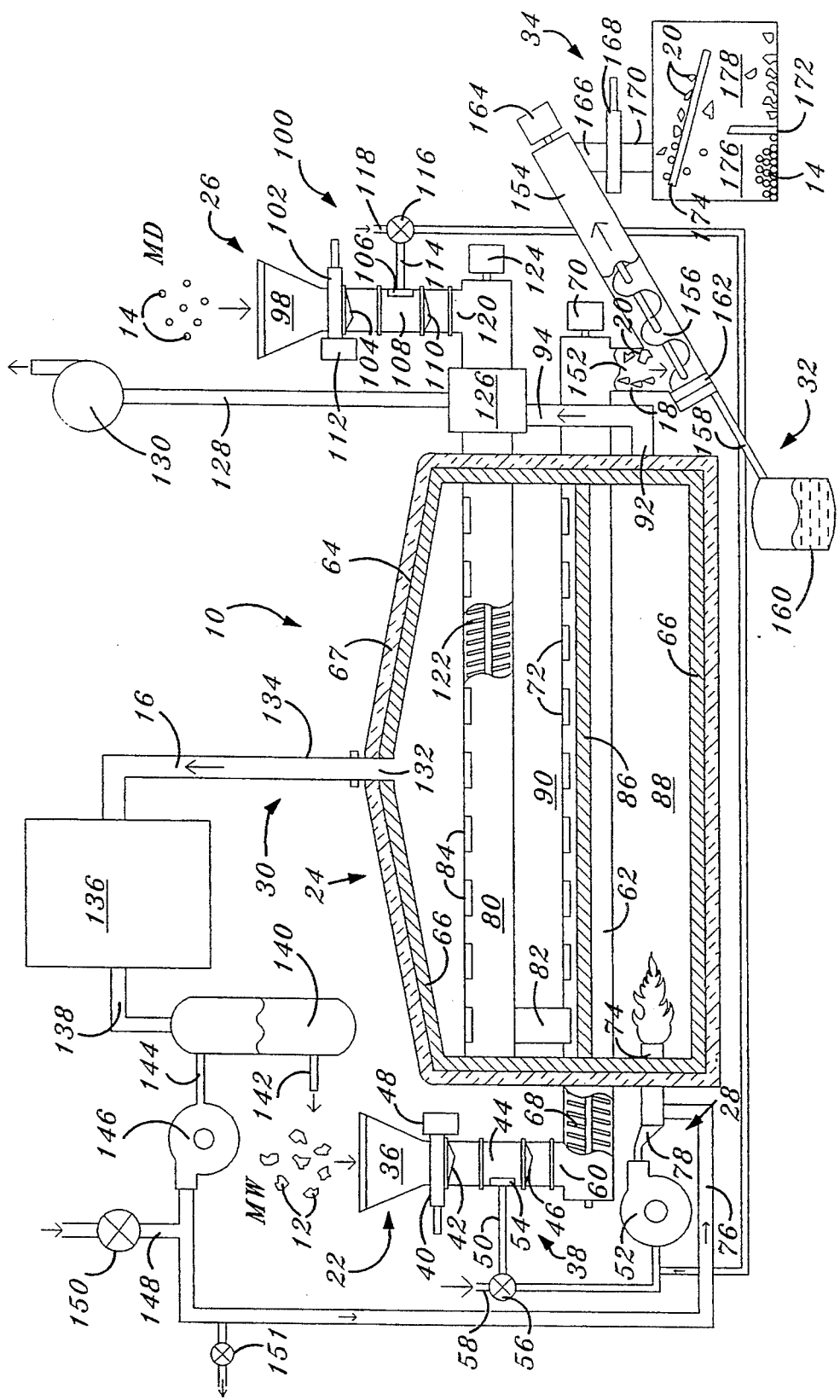
FIG. 1 is an overall diagrammatical view of a thermal conversion pyrolysis reactor system according to the present invention.

A preferred embodiment of the thermal conversion pyrolysis reactor system is illustrated in a schematic diagram in FIG. 1 and is referred to by the general reference character 10. In this illustration it may be seen that the pyrolysis reactor system 10 is adapted to receive input in two distinct forms, these being a waste input 12 ("MW") which is a carbonizable material such as tire chips, plastic bottles, hospital waste or the like, and a diffusion material input 14 ("MD"). The diffusion material 14 is a good heat retaining and conducting substance which is caused to mix with the waste input material 12 during the pyrolysis reaction in order to maximize the efficiency thereof.

The pyrolysis reactor system 10 is adapted to convert the waste input material 12 into a gaseous phase output 16, a liquid phase output 18 (nonexistent or insignificant in some situations) and a solid phase output 20. The thermal conversion pyrolysis reactor system 10 is adapted and constructed to be operated such that the various outputs are in the form of usable materials which require minimal additional processing, as opposed to many existing systems which create unacceptable pollutants and/or unduly complex output materials.

The thermal conversion pyrolysis reactor system 10 may be considered to be a combination of a variety of cooperating subsystems. In the preferred embodiment 10, these subsystems include a waste input subsystem 22, a pyrolysis chamber subsystem 24, a diffusion material input subsystem 26, a heating subsystem 28 and gaseous output subsystem 30, a liquid output subsystem 32 and a solid output subsystem 34. The various subsystems overlap to a certain degree and operate in conjunction to achieve the efficient overall continuous flow pyrolysis reaction.

Figure 2:
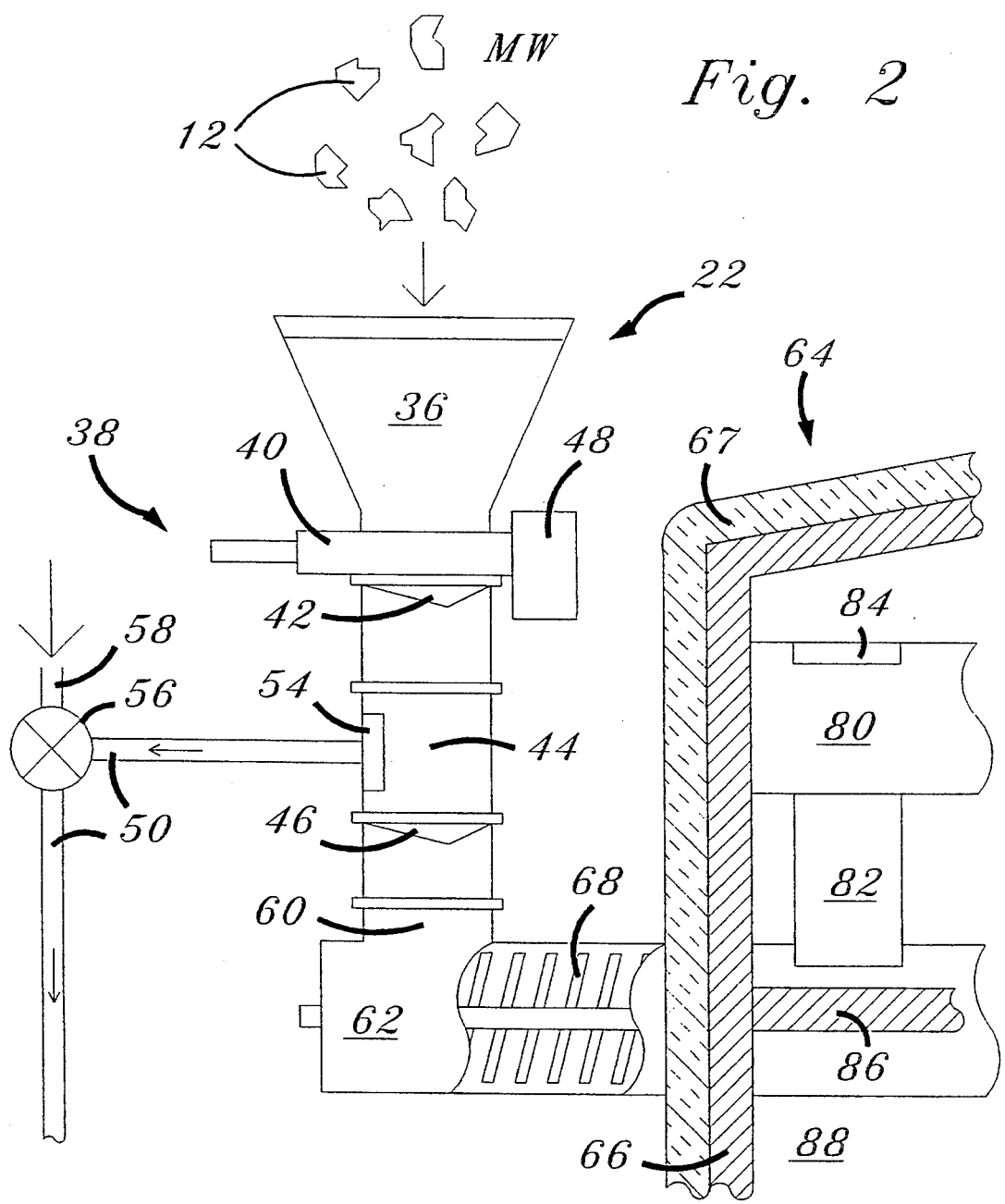
FIG. 2 is a diagrammatical view of the waste input subsystem portion of the overall reactor system.

As is illustrated in FIG. 1, and in more detail in FIG. 2, the waste input subsystem 22 is adapted to efficiently input the waste material MW 12 into the pyrolysis chamber subsystem 24. The waste input subsystem 22 may be seen to include a MW input hopper 36 in the general form of a funnel into which the carbonizable waste material 12 is delivered. Ordinarily, the MW 12 will be processed prior to input into the MW hopper 36 so that it is at least a marginally flowable material. That is, in the example of vehicle tires, these will be cut or ground into small chunks or chips (i.e. 5 cm diameter or less) so that they may be delivered through pipes and conduits and will not cause undue hangups in the waste input subsystem 22.

The MW input hopper 36 is located at the top of the waste input subsystem 22 to allow gravitational flow of the carbonizable waste material 12. The output of the MW input hopper 36 is into a waste conduit 38 which extends vertically downward. The waste conduit 38 represents an MW flow path, which includes, in vertical order, an MW slide gate 40, a first MW flat gate 42, an MW vacuum chamber 44, and a second MW flat gate 46. The MW slide gate 40, the first MW flat gate 42, and the second MW flat gate 46 control the flow of solid materials through the waste conduit 38. The opening and closing of the various gates is accomplished by an MW gate operating mechanism 48. The gate operating mechanism 48 is not shown in detail and may be any of a variety of constructions. It is expected that the gate operating mechanism 48 will be electrical, hydraulic or pneumatic. The gate operating mechanism 48 will be timed and programed to operate in sequential order. It is expected that the preferred mechanism will be pneumatic because this allows for rapid and powerful opening and closing of the gates.

The MW vacuum chamber 44 is connected via an MW vacuum pipe 50 to a blower/pump 52 (see FIG. 1) which also forms a portion of the heater subsystem 28. The blower/pump 52 creates a negative pressure within the vacuum pipe 50 and accordingly creates a negative pressure in the vacuum chamber 44. The advantage of utilizing vacuum to partially evacuate gaseous materials from the waste input material 12 and the waste conduit 38 is that it minimizes undesirable oxygen entering the pyrolysis chamber subsystem 24 and also captures and recycles fugitive hydrocarbon vapors which may escape from the pyrolysis chamber subsystem 24 through the waste input subsystem 22.

An MW screen filter 54 (ordinarily a screen lining the interior of the vacuum chamber or a substantial portion thereof to minimize clogging effects) is provided within the vacuum chamber 44 about the interface with the MW vacuum pipe 50. The screen filter 54 prevents solid waste materials from clogging the vacuum pipe 50. An MW vacuum control valve 56 is provided in the vacuum pipe 50 intermediate the vacuum chamber 44 and the blower/pump 52. The vacuum control valve allows air to be drawn into the blower/pump 52 through an MW bypass 58, even when the vacuum chamber 44 has already been evacuated and the gates are closed. This permits continuous operation of the blower/pump 52.

The sequential passage of a defined clump of MW 12 through the waste input subsystem is as follows. The carbonizable waste material 12 is deposited in the input hopper 36. The slide gate 40 is utilized to control the flow rate of the infeed material 12 into the waste conduit 38. The slide gate 40 is also a high strength structure which is designed to withstand the weight of the accumulated MW 12 in the hopper 36. When the slide gate 40 is opened the lowermost amount of the MW 12 will drop through the waste conduit 38 and be retained against the first flat gate 42. The slide gate 40 will then close, essentially acting as an air lock. It is understood the system is not intended to be strictly airtight but that the sealing is of sufficient viability to minimize the input of undesirable gaseous materials into the pyrolysis chamber subsystem 24.

In actual construction, the "gates" are likely to be specific components which include passages which form the waste conduit 38 and the actual gate mechanisms. A series of these conventional components can be connected together. These are constructed to be reasonably airtight, except if material gets jammed, so will often include some mechanism to clear the closure position as well. The exact nature of the gates is also primarily a matter of design choice.

Once the effective seal has been established by closing the slide gate 40, the first flat gate 42 is opened such that the MW 12 drops into the vacuum chamber 44 (on the top of the second slide gate 46). At this point, the vacuum control valve 56 operates automatically in order to evacuate the vacuum chamber 44 of gaseous materials by drawing the gases outward through the vacuum pipe 50. The second flat gate 46 is closed during this process to prevent drawing vapors from the chamber subassembly 24, except as such are already present from previous openings of the second flat gate 46. Ordinarily ten seconds is a sufficient evacuation interval. Subsequent to evacuation, the second flat gate 46 is opened to drop the MW 12 from the vacuum chamber 44 downward through the waste conduit 38 and into the reactor input 60, where it interfaces with the pyrolysis chamber subsystem 24. Simultaneously, fugitive gases from the chamber subsystem 24 will escape into the vacuum chamber 44 while the second flat gate 46 is open, and will be evacuated by the vacuum operation.

The MW 12 which is delivered into the reactor inlet 60 will drop into a pyrolysis transport pipe 62 which extends into a pyrolysis chamber 64 through a chamber wall 66. The pyrolysis transport pipe 62 extends laterally completely across the chamber 64 and passes through the opposing chamber wall 66 to interface with the solid output subsystem 34 and the liquid output subsystem 32. As is shown in FIG. 1, a waste transport auger 68 is situated within the transport pipe 62 to continually urge the waste material 12 forward and through the transport pipe 62. The auger 68 is continually driven by an auger motor 70, shown in FIG. 1.

The interior of the pyrolysis transport ("PT") pipe 62 is the locus where the primary pyrolysis reactions occur. The transport pipe 62 must be a strong, highly thermally conductive material, such as stainless steel, which is also resistant to material adhering to the surface and clogging the system. The upward facing surface of the pyrolysis PT pipe 62 is provided with a series of perforations 72. The perforations allow the escape of gaseous output materials 16 from the transport pipe 62, while not providing egress to a substantial amount of solid. The gaseous phase output 16 which is created within the pyrolysis transport pipe 63 during the pyrolysis process escapes through the perforations 72 and into the interior of the chamber 64.

The interior of the pyrolysis chamber 64 is defined by the enclosing chamber wall 66. The chamber wall 66 is preferably constructed of a high strength, corrosion resistant, non-stick material such as stainless steel which is able to withstand the high temperatures which are generated therein. The interior surface of the enclosing chamber wall is required to be a nonreactive material, such as stainless steel, particularly in those portions which are exposed to hydrocarbon gases generated during the pyrolysis process. In order to reduce energy loss and to maximize safe and tolerable ambient conditions, a substantial layer of insulation 67 is provided about the entire chamber 64. The insulation layer 67 provides protection against radiative heat loss from the chamber wall 66 and prevents escaping thermal energy from the chamber 64 from interfering unnecessarily with the other operations of the system 20.

In the case of the preferred embodiment 10, the elevated temperatures are provided by the heating subsystem 28, which is primarily illustrated in FIG. 1. The heating subsystem 28 of the preferred embodiment 10 includes one or more high power gas jet burners 74 which extend into the chamber 64 through the chamber wall 66. The gas jet burners 74 receive input from a fuel infeed 76, which will be discussed hereinafter, and an air infeed 78, as shown in FIG. 1. The air infeed 78 is attached to the output of the blower/pump 52. Consequently, some of the gaseous material delivered to the gas burners 74 is that which is evacuated from the vacuum chamber 44. The blower/pump 52 is always maintained at sufficient volume and pressure to fully fuel the gas burners 74 and further to maintain a relative positive pressure within the chamber 64. The blower/pump 52 provides sufficient air flow to provide a turbulent burn pattern in the gas burners 72, helping to avoid any "cold spots" from incomplete convection in the furnace space 88.

In addition to the pyrolysis transport pipe 62, the chamber 64 further encloses a diffusion material transport pipe 80. The MD transport pipe 80 extends across the chamber 64 above and parallel to the PT pipe 62. The MD transport pipe 80 is connected to the pyrolysis transport pipe 62 by a MD chute 82 situated near the point at which the pyrolysis transport pipe 62 enters the chamber 64. The MD transport pipe 80 is further provided with a series of MD perforations 84, similar to the MW perforations 72 of the PT pipe 62.

A partition 86 extends from the sides of the PT pipe 62 to the associated chamber wall 66 to provide an effective seal separating the interior of the chamber 64 into separate vertical zones. The partition 86 and the PT pipe 62 reasonably isolate the portions of the chamber 64 which exist below and above it. Since combustion gases and excess oxygen are introduced into the chamber 64 by the heater subsystem 28, it is important that the MW 12 be isolated from these in order to maintain the integrity of the pyrolysis reaction. That portion of the chamber 64 which is situated below the PT pipe 62 and the partition 86 is an effectively sealed heating chamber or furnace space 88. Since actual combustion is taking place constantly in the furnace space 88, and since oxygen (as opposed to hydrocarbon gases) present as reaction material, unlike in the reaction space 90, internal insulation may be desirable in the furnace space 88. For this reason, with exception of the lower surfaces of the PT pipe 62 and the partition 86, the interior of the furnace space 88 may be provided with a heat retentive lining such as a ceramic fire brick, or the like. That portion of the chamber 64 which includes the interior of the PT pipe 62 and all of the interior of the chamber above the partition 86 constitutes the reaction space 90 in which the pyrolysis reaction occurs.

The furnace space 88 includes the flame ends of the gas burners 74 and receives the combusted and uncombusted outputs therefrom. This will include noncombustible gases which may be received into the gas burners 74 from the blower/pump 52. The gas burners 74 will be controlled in order to maintain a highly elevated temperature within the furnace space 88, which, for the example of a pyrolysis system 10 adapted for use with vehicle tire chips, will be approximately 500° C.

Figure 3:
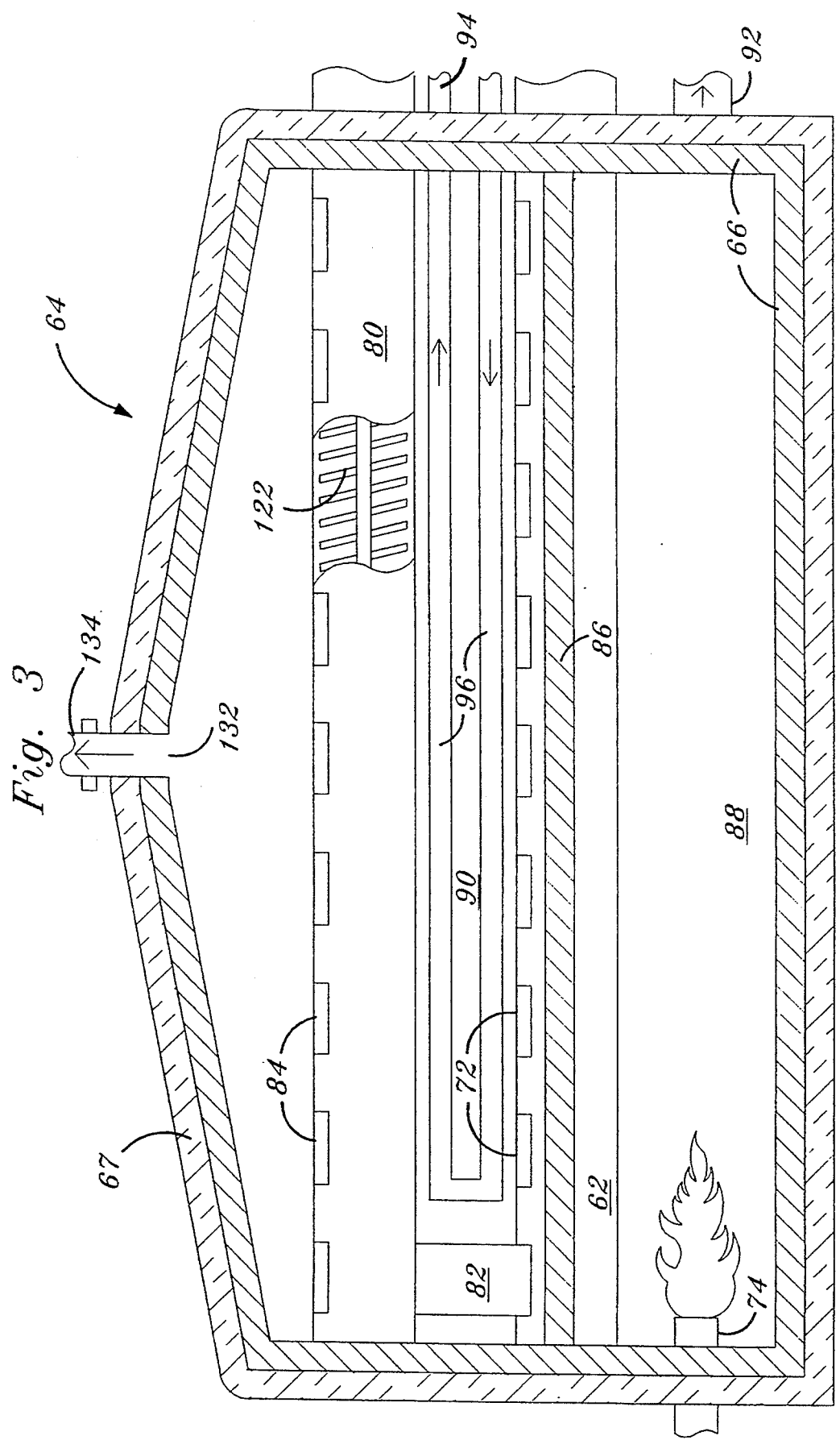
FIG. 3 is a diagrammatical view of the pyrolysis reactor chamber subsystem of the present invention showing an alternative embodiment utilizing a preheating exhaust gas conduit convolution.

An exhaust tube 92 extends outward from the chamber wall 66 at the opposing end of the furnace space 88 from the gas burners 74. The exhaust tube 92 is adapted to carry exhaust gases 94 generated within the furnace space 88 to other locations. In the illustration of FIG. 1, the exhaust tube 92 is seen to connect directly to the MD input subassembly 26, where the high temperature exhaust gases 94 are utilized to preheat the diffusion material 14. In the alternate embodiment illustrated in FIG. 3, the exhaust tube 92 includes one or more convolutions 96 which cause the sealed exhaust tube 92 to pass through the chamber wall 66 and into the reaction space 90. This allows the exhaust gases 94 to pick up additional heat from the thermal energy within the reactor space 90 and to be heated to an even more elevated temperature when they reach the MD input subassembly 26.

Figure 4:
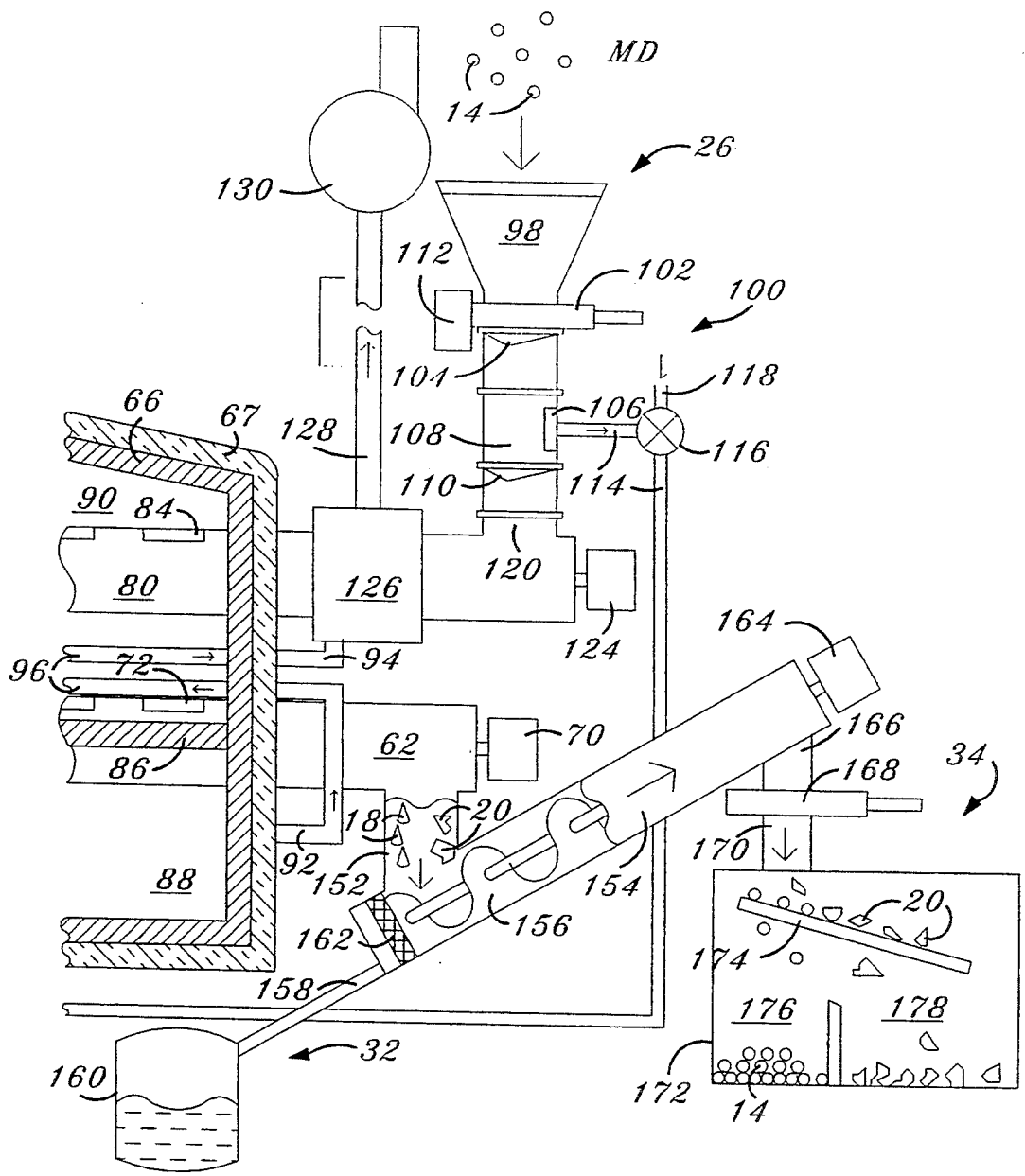
FIG. 4 is a diagrammatical view of the diffusion material input subsystem and the solid and liquid waste output subsystems according to the present invention.

The diffusion material 14 (referred to as "MD" 14) is introduced into the pyrolysis chamber subsystem 24 through the MD input subsystem 26, illustrated in FIGS. 1 and 4. It may be seen that the MD input subsystem 26 is very similar in construction and operation to the MW input subsystem 22.

Accordingly, the MD input subsystem 26 includes an MD input hopper 98 which delivers the diffusion material 14, ordinarily carbon black in the preferred embodiment 10, downward into an MD conduit 100. An MD slide gate 102, a first MD flat gate 104, an MD screen filter 106, situated within an MD vacuum chamber 108, and a second MD flat gate 110 lie within the MD conduit 100 below the MD input hopper 98. An MD gate mechanism 112, similar to the MW gate mechanism 48, controls the operation of the various gates and a vacuum evacuation system including a MD vacuum pipe 14, a MD control valve 116 and an MD bypass 118, is also provided. As may be seen from FIG. 1, the MD vacuum pipe 14 is also connected to the blower/pump 52 to provide evacuation of the MD vacuum chamber 108 through the MD screen filter 106 and further to deliver any fugitive vapors which escape the reaction space 90 through the MD input subassembly 26 back into the blower/pump 52 for attempted combustion by the turbulent gas burners 74.

The bottom of the MD conduit 100 interfaces with an MD inlet 120 which provides access for the diffusion material 14 into the MD transport pipe 80. Within the MD transport pipe 80, an MD auger 122 is driven by an MD drive motor 14. The MD auger 122 is angled in the opposite direction to the waste transport auger 68 such that the diffusion material 14 is urged through the MD transport pipe 80 in the direction opposite to the direction that the MW 12 is urged through the PT pipe 62.

The MD 14 is utilized for direct transfer of heat into the MW 12. The MD 14 is utilized to preheat the waste material and to facilitate the pyrolysis reaction by retaining and conducting heat into the MW 12 within the PT pipe 62. Further, when the diffusion material 14 is selected to be a material such as carbon black, it can serve to actually react with some of the components of the carbonizable waste material 12 or to catalyze reactions which result in efficient pyrolysis and cracking of the materials and lead to a greater yield of usable output.

Since it is desirable to have the diffusion material 14 already established at a very high temperature and retained heat level prior to being delivered to the MD chute 82, which drops the MD 14 into the MW 12 being driven through the PT pipe 62 by the waste transport auger 68, the MD transport pipe 80 extends within the reaction chamber 90 so that it and its contents are preheated. Further, additional heat is delivered to the diffusion material 14 by the heated exhaust gases 94 which are carried in the exhaust tube 92, particularly when the exhaust tube 92 includes the convolutions 96 which result in additional heat being absorbed by the exhaust gases 94 before they are delivered into the diffusion material 14. The interface between the exhaust gases 94 and the diffusion material 14 occurs at a heat exchanger device 126 which is situated at the end of the MD transport pipe 80 which is adjacent to the MD inlet 120.

The nature of the heater exchanger 126 may be any of several structures which permits the exhaust gases 94 to provide preheating to the MD 14 which is carried within the MD transport pipe 80. This may be as simple as a chamber formed about the MD transport pipe 80 with the exhaust gases 94 passing therethrough, or it may be a more complex and convoluted heat exchanger device 126. In the preferred embodiment 10, as shown in FIGS. 1 and 4, the outlet of the heat exchanger 126 is in the form of an exhaust outlet 128 which has an exhaust fan 130 included therein. The exhaust fan 130 is operated in order to continually draw the exhaust gases 94 out of the furnace space 88 and through the heat exchanger 126, in order to maintain good combustion conditions within the furnace space 88 and also to continually preheat the diffusion material 14.

The diffusion material 14, after being partially preheated by the exhaust gases 94 and the heat exchanger 126, is continually driven through the MD transport pipe 80 by the MD auger 122. The predominant portion of this travel path will lie inside the pyrolysis chamber 64 and in the reaction space 90. The elevated temperature within the reaction space 90, and the conductive transfer of heat to the MD 14 from the gaseous output 16 of the MW 12, will cause further preheating of the MD 14 as it passes through the MD transport pipe 80. The conductive heat transfer is permitted by the MD perforations 84 which allow the gases to intermix with the MD 14. The MD perforations 84 further allow the escape of expansion gases which may be created in the MD 14 as it passes through the MD transport pipe 80.

At the end of the chamber 64 opposite the MD input subsystem 26, the MD 14 is delivered from the MD transport pipe 80 to the MD chute 82. At this point the diffusion material 14 is dropped into the pyrolysis transport pipe 62 where it is mixed (by the action of the waste transport auger 68) with the waste material 12 which is already present in the PT pipe 62. This mixing of the diffusion material 14 with the waste material 12 improves the efficiency of the pyrolysis process by conductive heat transfer and also, to a lesser degree, by direct reaction or catalysis. It may also be seen that in points forward on the flowpath from the MD chute 82, the content of the PT pipe 62 will be a mixture of the waste material 12 and the diffusion material 14, with the pyrolysis process being continually in progress throughout the length of the PT pipe 62.

The result of pyrolysis on the input waste material 12 is the geration of reaction products in the form of the gaseous phase output 16, the liquid phase output 18 and the solid phase output 20. The gaseous phase output 16 is handled by a gaseous output subsystem 30 which is illustrated in FIG. 1 while the liquid output 18 and the solid output 20 will be carried through the PT pipe 62 and be delivered to the solid output subsystem 34, from which the liquid output subsystem 32 branches. The liquid output subsystem 32 and the solid output subsystem 34 are illustrated in FIGS. 1 and 4.

Referring to FIG. 1, it may be seen that the gaseous phase output subsystem 30 is adapted to receive the gaseous phase output 16 which will be drawn through a gas outlet 132 situated at the top of the chamber 64. The gas outlet 132 connects the chamber 64 to a gas tube 134. The gas tube 134 extends upward and away from the chamber 64. The hydrocarbon gases continue through the gas tube 134 and enter into a condenser unit 136. Within the condenser unit 136, the gaseous output 16 is primarily converted into hydrocarbon gases and various liquids. Typically, the condenser unit 136 may utilize oil quenching, water cooling or forced air condenser technology.

From the condenser unit 136, the output is delivered through a condenser conduit 138 to a storage tank 140. From the storage tank 140, the liquid components are drawn off through a fluid conduit 142 for further processing. The fluid components may be in the forms of oils, hydrocarbon liquids or other fluids which can then be refined by conventional techniques. Primarily, the fluid contents will be hydrocarbons which can be utilized for a variety of purposes, once separated into components.

Those portions of the gaseous output 16 which remain in the gaseous phase 16 after passing through the condenser unit 136 are then removed from the storage tank 140 through a gas conduit 144 which is connected to a gas pump 146. The gases which are delivered through the gas conduit 144 to the gas pump 146 are primarily combustible hydrocarbon gases, such as methane, which are suitable for use as fuel for the gas jet burners 74. Accordingly, the output for the gas pump 146 is into the fuel infeed line 76 where it forms the primary burner fuel.

For those circumstances in which the supply of combustible hydrocarbon gases from the storage tank 140 is insufficient to fuel the burners 74, an auxiliary natural gas feed 148 is provided with an auxiliary gas valve 150 to control the flow of gas from an outside source, such as a tank or a utility line. It is expected that during full operation, the auxiliary gas valve 150 may be closed since enough hydrocarbon fuel will be generated to operate the burners 74, but it will be open at the time of startup and at any time during which the fuel flow from the storage tank 140 is insufficient to provide for the burners 74.

It is also possible that, at times, the pyrolysis reaction and energy conservation techniques will be so efficient that more combustible hydrocarbon gas may be produced by the gaseous phase output subsystem 30 than can be efficiently combusted by the turbulent gas burners 72. For this reason, an excess gas bleed value 151 is provided to allow removal and storage of excess production.

The components of the preferred liquid output subsystem 32 and solid output subsystem 34 are illustrated primarily in FIG. 4, wherein it may be seen that the material which is delivered to the output end of the PT pipe 62 by the action of the waste transport auger 68 will be delivered to a drop chute 152 which extends downward into a conveyor tube 154. The material within the drop chute 152 will be a mixture of liquid output 18 and solid output 20, in most cases. It is understood that in most cases that the liquid component of the output of the thermal conversion pyrolysis reactor system 10 will be rather minimal, at least through the PT pipe 62, and what liquid material exists may be captured in the material of the solid output 20 so that it is not a separate component. However, in certain circumstances it is important to provide for the collection of the liquid output 18 so that it may be separately collected. The solid output material 20 is delivered up the conveyor tube 154 by a screw conveyor 156, while the liquid material 18 will flow down to the bottom of the conveyor tube 154 and through a drain tube 158 to a collector tank 160. A filter disk 162 may be provided in the conveyor tube 154 to prevent the solid output material 20, which may be in the form of flowable powders, from clogging the drain tube or flowing into the collector tank 160. The liquid phase output 18 which is collected in the collector tank 160 will be subjected to further treatment, as needed, depending on its nature and quantity.

The solid phase output 20, which will be in the form of waste residue and diffusion material 14, will be transported up the conveyor tube 154 by the screw conveyor 156, which is powered by a conveyor motor 164. The residue material is carried up the screw conveyor 156 to the top of the conveyor tube 154 where it is delivered to a residue chute 166. The bottom of the residue chute 166 rests against a residue slide gate 168. The residue will rest on the residue slide gate 168 until the slide gate 168 is opened, when it will drop through a collection chute 170 into a collection hopper 172.

In many embodiments it may be desirable to provide additional cooling to the solid residues. This may be accomplished by cooling jackets or heat exchanger devices about the conveyor tube 154. Forced air cooling may also be desirable as a means of reducing the residue temperature to facilitate subsequent handling.

In the preferred embodiment of the present invention 10, one of the advantages is that the diffusion material 14 will be substantially recoverable from the residue. The mechanism for accomplishing this is that as the residue passes from the collection chute 170 into the collection hopper 172 it will drop onto a separator unit 174. The preferred separator unit 174 will be in a form of a fine mesh screen which has a mesh which is sufficiently open to allow the particulate carbon black diffusion material 14 to pass through into a MD collector compartment 176 in the collection hopper 172, with the MD collector compartment 176 being situated beneath the separator screen 174. The preferred separator screen 174, which is illustrated in FIGS. 1 and 4, is inclined such that the larger diameter particulate residue will not pass through the separator screen 174 and will be caused to slide off the end of the screen 174 into a residue collector compartment 178.

It is understood that the above discussion of the separator system presupposes a fine particulate form of MD 14, such as carbon black, which has a smaller particulate diameter than the remainder of the solid residue. If a pellet type MD 14 is utilized, the reverse may be the case and the MD may have a larger particle diameter. In such an instance the arrangement of the MD collector compartment 176 and the residue collector compartment 178 will be interchanged.

As will be understood by those skilled in the art, various modifications and alterations of the specific structure described above as constituting the preferred embodiment may be utilized with acceptable results. For example, the specific structures of the chutes, gates and tubes described above may be modified substantially while still retaining the primary functional characteristics and providing results which are improved over those of the prior art. Certainly, the dimensions and materials may also be modified, particularly depending upon the specific purpose for which the thermal conversion pyrolysis reactor system 10 is intended to be used.

One component of the process which is significant is the selection of the diffusion material 14. As described above, the preferred MD 14 is carbon black, a fine grained crystalline carbon material. Other diffusion materials may be appropriate, but they must be selected from those which have high thermal conductivity and substantial corrosion resistance. An alternate potential MD 14 is a corrosion resistant metal such as pellets of stainless steel. Some other metal materials, such as tin, lead and alloys thereof, are not suitable for use as the MD 14 because of their low melting points. Other materials which are excellent heat conductors, such as silver and copper, are highly suitable for that purpose but can have undesirable side effects since there may be reactions between these metals and the hydrocarbon products involved. Ceramic diffusion materials such as aluminum nitride, silicon carbide and the like are corrosion resistant and could be utilized as the diffusion material 14. However, ceramic materials have a tendency to break up and are not as easily recycled so these are not preferred.

Another group of materials which may be acceptable as the thermal diffusion material 14 are those of the class of tungsten compounds which are corrosion resistant. These include such tungsten compounds as tungsten dioxide, tungsten trioxide and tungsten carbide. A potential disadvantage of the tungsten compounds is that they are very dense (heavy) and may require a stronger material handling structure. This can be reduced somewhat by utilizing a mixture of tungsten compounds with a lighter material, such as stainless steel.

One of the advantages of materials such as carbon black is that the graphite structure provides a lubricating action as well as heat transfer. This acts to optimize the material flow through the reactor and to prevent problems such as clogging. This, with the rotational motion provided by the transport auger 68, provides a cleansing and lubricating effect which minimizes the necessity for stopping the process for cleaning. The combined effects of lubrication and heat transfer result in maximum efficiency of the process. Additionally, some of the diffusion material 14 may be added into the MW input hopper 36 from time to time in order to help clean the waste conduit 38 and the associated structure.

The dimensions and materials of the reactor and the associated mechanism will be selected to suit the intended purpose, with any combinations being appropriate and with empirical adjustments of the ratio of diffusion material 14 to waste material 12.

Those skilled in the art will readily recognize that numerous other modifications and alterations of the specific structures, dimensions, materials and components may be made without departing from the spirit and scope of the invention. Accordingly, the above disclosure is not to be considered as limiting and the appended claims are to be interpreted as encompassing the entire scope of the invention.

INDUSTRIAL APPLICABILITY

The thermal conversion pyrolysis reactor system 10 according to the present invention is adapted to be utilized in a wide variety of industrial and municipal applications wherein it is desired to convert carbonizable material into usable byproducts. The system 10 is adapted particularly for use with waste products such as vehicle tire chips, plastic bottles and hospital waste. Assuming initial products which generate a substantial amount of hydrocarbon gases upon pyrolyzation, the system 10 is adapted to be self powering, after initialization.

When it is desired to utilized the invention, the gas jet burners 74 are activated to preheat the furnace space 88 to the desired temperature prior to inputting any material. For the example where the waste material 12 to be pyrolyzed is shredded tire material, the operation temperature will be in the range of 400° to 760° C. (750° to 1400° F.) although higher temperatures, within the tolerances of the materials, may be utilized for a variety of purposes. It is desirable to provide a heating temperature in the furnace space 88 which is generally far higher than the vaporization temperature of the MW 12 in order to maintain good operating efficiency.

Once the chamber has been preheated, it is desirable to begin feeding the diffusion material 14 into the diffusion material input system 26. This is accomplished such that preheated diffusion material 14 is already in place by the time the first dollop of waste material 12 reaches the reactor chamber 64. The MD 14 is preheated first by the action of the exhaust gases in the heat exchanger 126 and then by the heat of the reactor chamber 90 as the MD 14 passes through the MD transfer pipe 80.

The waste material 12 placed in the input hopper 36 is then delivered through the gate system (described above) to the reactor inlet 60. In the incoming MW 12 will be substantially evacuated of excess gases, with the desire being to eliminate oxygen, in particular, by the action of the vacuum force applied to the vacuum chamber 44. Although it is expected that the MW 12 will be primarily in the form of solids, it is possible there may be liquids components as well. All of these will be delivered by gravity feed and the operation of the gate operating mechanism 48 to the pyrolysis transport pipe 62.

The action of the waste transport auger 68 will drive the waste material 12 forward through the PT pipe 62 to the point at which it lies directly beneath the diffusion material chute 82, at which time preheated diffusion material 14 will be deposited thereon and mixed therewith by action of the auger 68. The MD 14 will act as a heat transfer medium and as a lubricant, and to a lesser degree, as a reaction catalyst. The heat transfer properties of the diffusion material 14 act to heat the MW 12 more rapidly such that a faster flow process may be feasible. This means that the auger motor 70 may be operated at a reasonable speed in such a manner that complete pyrolysis within the pyrolysis chamber subassembly 24 may be achieved in minimal amount of time. For a furnace chamber temperature of approximately 750° C. (1382° F.), and an MD 14 of stainless steel and aluminum nitride pellets, it is expected that a resident time of approximately 25 minutes in the pyrolysis reactor subassembly 24 will be needed in order to pyrolyze the typical tire chip material.

During the pyrolysis reaction, the MW 12 will be broken down in an oxygen free reaction to form hydrocarbon gas material and other gaseous phase output 16 and residual solid phase output 20. When the MW 12 selected is tire chips, only a very minimal amount of liquid phase output 18 is produced. The gaseous phase output 16 will escape from the PT pipe 62 through the perforations 72 on the upper surface thereof. These gases will then pass through the reaction chamber 90, with a certain amount acting to help preheat the diffusion material 14 and the MD transport pipe 80, and will exit the chamber 64 through the gas outlet 132. The gaseous phase output 16 will then be treated by the gaseous output subsystem 30, as described above, with a portion thereof being combustible hydrocarbon gases which are then delivered back to the heating subsystem 28 in order to provide fuel for the turbulent gas jet burners 74. In this manner, the thermal conversion pyrolysis reactor system 10 becomes substantially self powered and can operate as a continuous flow process without additional fuel.

The solid phase output 20, primarily the diffusion material 14, additional carbon caused by pyrolysis of the carbonizable waste materials, and noncarbonizable materials found in tires, such as the residue of steel cables and fiberglass or other synthetic cable materials, will be delivered through the end of the PT pipe 62 to the drop chute 152, where they will drop into the conveyor tube 154. Any liquid phase output 18 will then pass through the filter disk 162 and downward to the collector tank 160. The residual solids will then be carried upward within the slanted conveyor tube 154 by the action of a screw conveyor 156 to a residue chute 166.

When a desired amount of material has collected in the residue chute 166, the residue slide gate 168 will open and deposit the material through a collection chute 170 on top of the separator unit 174. The separator screen 174, situated within the collection hopper 172, will then, via vibration, allow the diffusion material 14 to pass therethrough into the MD collector compartment 176, with the remainder of the residue being delivered to the residue collector compartment 178. The diffusion material 14 which is collected in the MD collector compartment 176 may then be reutilized for input into the MD hopper 98.

The result of the output of the system 10 will be exhaust gases 94 from the furnace space 88, which will pass to the ambient atmosphere through the exhaust outlet 128, liquid phase hydrocarbons which are the result of condensation of the gaseous phase output 16, as converted by the condenser 136, liquid phase output 18 collected in the collector tank 160 and the solid residue 20 which resides in the residue collector compartment 178. Given the parameters of the MW 12, it is expected that each of these resulting materials will be relatively easily handled and usable materials, as contrasted with the waste products which are input into the pyrolysis reactor system 10.

Although described above as applicable to vehicle tire fragments, the pyrolysis apparatus and method can also apply to other carbonizable materials such as wood chips, carpet, plastic, sewage sludge and the like. For general waste materials, presorting is preferred in order to remove materials which are resistant to the reactions or which could foul the apparatus. These will include materials such as glass, aluminum cans and the like. The general goal is to vaporize the infeed material as effectively and efficiently as possible.

The use of carbon black as the diffusion material 14 is particularly desirable when the input MW 12 is hospital waste or other materials which may contain unstable or hazardous chemical compounds. The carbon black is utilized to react with the infeed material during the thermal conversion pyrolysis process due to the fact that it will combine to stabilize and break down many of the hazardous chemical materials which might otherwise vaporize and contaminate the gaseous phase output subsystem 30 in a normal pyrolysis reaction. Under these circumstances the primary goal is to yield desired hydrocarbon vapors effectively and efficiently without the production of undesired byproducts.

In light of the many efficiencies and advantages of the thermal conversion pyrolysis reactor system 10 of the present invention, it is expected to appeal to a great number of potential users. Efficiency of operation, minimum down time for cleaning, substantial self-powering, and recyclability of the diffusion material 14 provide advantages which make the structure attractive. Accordingly, it is expected that the thermal conversion pyrolysis reactor system 10 according to the present invention will have industrial applicability and commercial utility which are both wide spread and long lasting.

We claim:

1. A pyrolysis reactor system for use in pyrolyzing carbonizable input material (MW), comprising:
   a reactor chamber subsystem including an enclosed reactor chamber;
   an MW input subsystem for inputting carbonizable material into said reactor chamber subsystem;
   an MD input subsystem for inputting diffusion material (MD) into said reactor chamber subsystem;
   heating means for maintaining the interior of said reactor chamber subsystem at a temperature sufficient to pyrolyze the carbonizable material;
   a gaseous phase output subsystem for receiving and processing the gaseous phase products of pyrolysis reactions from said reactor chamber subsystem; and
   transport means for transporting the MW and MD from said associated input subsystem, through said reactor chamber subsystem, and through nongaseous phase output subsystems situated at an end thereof;
   wherein, the MD is preheated to a higher temperature than a MW temperature and mixed with the MW near the location at which the MW enters said reactor chamber subsystem, such that the MD acts to conductively heat the MW and enhance the pyrolysis process thereon as the MW and MD are carried together through said reactor chamber subsystem.

2. The pyrolysis reactor system of claim 1 wherein said transport means for transporting the MW and the MD include:
   a pyrolysis transport pipe extending horizontally within said reactor chamber for carrying the MW, the pyrolysis transport pipe having an input end adjacent to said MW input subsystem and an output end adjacent to the nongaseous phase output subsystem;
   an MD transport pipe extending generally horizontally within said reactor chamber for carrying and preheating the MD, the MD transport pipe being disposed above the pyrolysis transport pipe and having an input end adjacent to said MD input subsystem and a terminal end;
   an MD chute disposed intermediate the terminal end of the MD transport pipe and a location near the input end of the pyrolysis transport pipe;
   an MD auger extending through the MD transport pipe and being associated with an MD auger motor such that the MD auger is rotated so as to drive the MD through the MD transport pipe to the terminal end and to urge the MD material to be gravitationally delivered through the MD chute to the pyrolysis transport pipe; and an MW auger extending through the pyrolysis transport pipe and being associated with an MW auger motor such that the MW auger is rotated so as to mix the MD entering the pipe from the MD chute with the MW received from said MW input subsystem and to drive the MW and the admixed MD from the input end to the output end.

3. The pyrolysis reactor system of claim 2 wherein the pyrolysis transport pipe is provided with perforations on the upper surface thereof to allow the escape of gaseous phase output from the pyrolysis reaction.

4. The pyrolysis reactor system of claim 2 wherein dividing means extend from the pyrolysis transport pipe to the walls of said reactor chamber so as to separate said reactor chamber into a furnace space situated below the dividing means and a reaction space situated above the dividing means, the interior of the pyrolysis transport pipe being a portion of the reaction space.

5. The pyrolysis reactor system of claim 4 wherein the MD transport pipe is situated within the reaction space and is provided with upwardly disposed perforations to permit gases within the reaction space to contact and transfer heat to the MD being carried through the MD pipe.

6. The pyrolysis reactor system of claim 4 wherein exhaust gases from the furnace space are delivered to a heat exchanger associated with said MD input subsystem for transferring heat to the MD.

7. The pyrolysis reactor system of claim 1 wherein said MW input subsystem and said MD input subsystem each include degassing means for substantially removing oxygen and fugitive gases from the MD and MW prior to delivery into said reactor chamber, the degassing means including a degassing chamber having a first gate, a second gate, and vacuum means chamber.

8. The pyrolysis reactor system of claim 1 wherein said gaseous phase output subsystem includes means for delivering recycled combustible gases to said heating means.

9. A thermal conversion pyrolysis reactor system, for pyrolyzing carbonizable material ("MW"), comprising:

a thermal pyrolysis chamber, the interior of which is heated to a temperature ("T") sufficient to substantially pyrolyze the MW in a moderate length of time;

MW means for delivering the MW into and through said thermal pyrolysis chamber;

MD means for delivering a heat diffusion material ("MD") to the interior of said chamber in a manner such that the MD is mixed with the MW and is concurrently therewith delivered through said thermal pyrolysis chamber;

MD preheating means for heating the MD to a temperature approaching T prior to delivery to and mixing with the MW; and output handling means for receiving and processing the reaction products of the pyrolysis process and the unreacted output of said thermal pyrolysis chamber.

10. The thermal conversion pyrolysis reactor system of claim 9 wherein said MD means and said preheating means include an MD transport pipe extending substantially within the interior of said thermal pyrolysis chamber, such that the MD being delivered therethrough absorbs ambient heat from the interior of said thermal pyrolysis chamber prior to mixing with the MW.

11. The thermal conversion pyrolysis reactor system of claim 9 wherein said thermal pyrolysis chamber is separated into a furnace space wherein combustive heating is provided by turbulent burners to evenly heat the interior and a reaction space in which the MW and MD are situated during the pyrolysis reaction; and said preheating means include delivery of exhaust gases generated in the furnace space to preheat the MD.

12. The thermal conversion pyrolysis reactor system of claim 11 wherein said output handling means include means for recycling combustible gaseous reaction products for use in the turbulent burners.

13. The thermal conversion pyrolysis reactor system of claim 11 wherein said MW means and said MD means each include degassing means for substantially removing gases from the MW and MD prior to delivery to said thermal pyrolysis chamber, the gases removed by the degassing means being delivered to the turbulent burners, the degassing means including an airlock with a valve, the valve passing the removed gases to the turbulent burners.

14. The thermal conversion pyrolysis reactor system of claim 9 wherein said output handling means include means for separating the MD from other reaction products such that the MD may be recycled for additional use.

15. The thermal conversion pyrolysis reactor system of claim 9 wherein the interior of said thermal pyrolysis chamber is maintained at a positive pressure with respect to ambient such that entry of oxygen bearing gases thereinto is minimized.

16. In a thermal conversion pyrolysis reactor system for pyrolyzing carbonizable material ("MW"), including a heated reactor chamber, an MW input assembly, means for transporting the MW through the reactor chamber and output processing means for handling the products, byproducts and residues of a flow-type pyrolysis reaction process, the improvement comprising:

providing a preheated thermal diffusion material ("MD") for admixing with the MW such that the MW is mixed and transported concurrently with MD within the chamber such that heat is conductively transferred from the MD to the MW so as to enhance the pyrolysis reaction and reduce the elapsed reaction time to acceptable completion.

17. The improvement of claim 16 wherein the pyrolysis reactor system is made self supporting by recycling combustible reaction products from the output processing means to burner components utilized to elevate the temperature of the heated reactor chamber.

18. The improvement of claim 16 wherein the MD is preheated by being resident for a substantial interval within the heated chamber prior to being admixed with the MW.

19. The improvement of claim 16 wherein the interior of the reaction chamber is maintained to be substantially free of oxygen by degassing the MW and MD prior to entry thereinto by isolating a portion of MW and MD in degassing chambers and applying a vacuum thereto, and by maintaining the reactor chamber at a relative positive pressure.

20. The improvement of claim 16 wherein the MD is selected to be carbon black.

* * * * *